(12) United States Patent
Lecointre et al.

(10) Patent No.: US 11,021,119 B2
(45) Date of Patent: *Jun. 1, 2021

(54) GARMENT AND TETHER SYSTEM FOR CONNECTION TO A VEHICLE

(71) Applicant: BOMBARDIER RECREATIONAL PRODUCTS INC., Valcourt (CA)

(72) Inventors: Alexandre Lecointre, Sherbrooke (CA); Jerome Demers, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,730

(22) Filed: Feb. 4, 2020

(65) Prior Publication Data

US 2020/0172026 A1 Jun. 4, 2020

Related U.S. Application Data

(62) Division of application No. 16/304,074, filed as application No. PCT/IB2017/053212 on May 31, 2017, now Pat. No. 10,596,986.

(Continued)

(51) Int. Cl.
*B60R 16/027* (2006.01)
*A41D 1/00* (2018.01)
(Continued)

(52) U.S. Cl.
CPC ............ *B60R 16/027* (2013.01); *A41D 1/005* (2013.01); *A41D 13/0051* (2013.01); *B60K 28/04* (2013.01); *B62H 5/00* (2013.01); *B62J 27/00* (2013.01); *B62J 33/00* (2013.01); *B62M 27/02* (2013.01); *H05B 2203/036* (2013.01)

(58) Field of Classification Search
CPC .. B60R 16/027; A41D 13/0051; A41D 1/005; B60K 28/04; H05B 2203/036
See application file for complete search history.

(56) References Cited

U.S. PATENT DOCUMENTS 1,691,472 A 11/1928 Graham et al.
4,850,906 A 7/1989 Kanno
(Continued)

OTHER PUBLICATIONS

International Search Report of PCT/IB2017/053212; Lee W. Young; dated Nov. 13, 2017.
(Continued)

*Primary Examiner* — Drew J Brown
(74) *Attorney, Agent, or Firm* — BCF LLP (57) ABSTRACT

A garment and tether system is presented. The system includes a garment and tether. The garment includes: a garment body, and at least one electrical element connected to the garment body. The tether includes: a first end and a second end, at least one electrical conductor operatively connected between the first and second ends, and an electrical contact at the second end. The tether is connected to the garment at the first end, the second end being removably connectable to a base disposed on a vehicle. The base is adapted to provide power to the at least one electrical conductor of the tether via the electrical contact. The at least one electrical element is provided power from the vehicle via the tether.

7 Claims, 6 Drawing Sheets

Related U.S. Application Data (60) Provisional application No. 62/343,459, filed on May 31, 2016.

(51) Int. Cl.
*A41D 13/005* (2006.01)
*B60K 28/04* (2006.01)
*B62M 27/02* (2006.01)
*B62J 33/00* (2006.01)
*B62H 5/00* (2006.01)
*B62J 27/00* (2020.01)

(56) References Cited

U.S. PATENT DOCUMENTS

| | | |
|---|---|---|
| 5,171,171 A | 12/1992 | Tani |
| 6,352,045 B1 | 3/2002 | Takashima |
| 6,417,491 B1 | 7/2002 | Taniuchi |
| 6,563,424 B1 | 5/2003 | Kaario |
| 6,772,061 B1 | 8/2004 | Berthiaume et al. |
| 6,997,573 B2 | 2/2006 | Maese |
| 7,044,814 B2 | 5/2006 | Kamio et al. |
| 7,077,538 B2 | 7/2006 | Wooldridge |
| 7,198,527 B2 | 4/2007 | Shirayanagi |
| 7,344,379 B2 | 3/2008 | Marmaropoulos et al. |
| 8,009,031 B2 | 8/2011 | Pacheco et al. |
| 8,063,307 B2 | 11/2011 | Bukshpun et al. |
| 8,308,489 B2 | 11/2012 | Lee et al. |
| 9,096,174 B1 | 8/2015 | Banks |
| 10,155,558 B1 | 12/2018 | Thompson et al. |
| 10,596,986 B2 * | 3/2020 | Lecointre ............... A41D 1/005 |
| 2002/0044052 A1 | 4/2002 | Steward |
| 2002/0179356 A1 | 12/2002 | Morii et al. |
| 2007/0228768 A1 | 10/2007 | Kobayashi |
| 2010/0228405 A1 | 9/2010 | Morgal et al. |
| 2010/0253501 A1 | 10/2010 | Gibson |
| 2012/0074128 A1 | 3/2012 | Blackford et al. |
| 2013/0037531 A1 | 2/2013 | Gray et al. |
| 2014/0015470 A1 | 1/2014 | Lim et al. |
| 2014/0246416 A1 | 9/2014 | White |
| 2014/0261236 A1 | 9/2014 | Herberth |
| 2014/0263264 A1 | 9/2014 | Weir et al. |
| 2014/0353300 A1 | 12/2014 | Swiatek et al. |
| 2015/0114343 A1 | 4/2015 | Bernier et al. |
| 2015/0230524 A1 | 8/2015 | Stevens et al. |
| 2017/0095013 A1 | 4/2017 | Bessette et al. |

OTHER PUBLICATIONS

International Preliminary Report on Patentability of PCT/IB2017/053212; Paul Dickson; dated Jul. 20, 2018.
Snowmobile Safety and Certification Committee, Inc., SSCC/11 Supplement—Detailed Standards and Testing Specifications and Procedures, Mar. 28, 2019 (Revised), Michigan, USA.
Bombardier Recreational Products Inc., 2016 Operator's Guide MX ZX 600RS, 2015, Canada.

* cited by examiner

GARMENT AND TETHER SYSTEM FOR CONNECTION TO A VEHICLE

CROSS-REFERENCE

The present application is a divisional application of U.S. patent application Ser. No. 16/304,074, filed Nov. 21, 2018, which is a National Phase Entry of PCT Application No. PCT/IB2017/053212, filed May 31, 2017, which claims priority to U.S. Provisional Patent Application No. 62/343,459, filed May 31, 2016.

TECHNICAL FIELD

The present technology relates to a tether system for providing power from a vehicle to a garment, a vehicle with a tether system, and a garment with a tether system.

BACKGROUND

Heated garments, having electrically operated heating elements, are sometimes used for keeping a rider warm when riding a vehicle where the rider is exposed to the elements. For example, it may be desirable to wear heated garments when riding a snowmobile or motorcycle. A variety of different garments can be provided with heating elements, including jackets, jacket liners, pants, boots, gloves, goggles and helmets. Goggles and helmet visors can be also be provided with heating elements to reduce moisture accumulation on the interior side of the goggles or helmet visors. It is also known to provide garments with plugs for charging mobile telephones and the like. It is also known to provide helmets with radio communication systems.

In some cases, the electrified garments draw power directly from the vehicle. Typically such a garment will need to be provided with an electrical connection kit to connect to the vehicle's magneto or alternator, as the start-up battery may not be able to supply sufficient wattage to power the heating elements. This kit will generally need to be disconnected when the rider dismounts the vehicle.

SUMMARY

One object of the present is to ameliorate at least some of the inconveniences of the prior art.

One broad aspect of the present technology provides a tethering system for connecting a user's garment to a vehicle, wherein the tether system provides safety and/or anti-theft features, along with an electrical connection for providing power from the vehicle to an electrified garment.

In accordance with an aspect of the present technology, there is provided a garment and tether system comprising a garment including a garment body, and at least one electrical element connected to the garment body; and a tether including a first end and a second end, at least one electrical conductor operatively connected to the first and second ends, and an electrical contact at the second end, the tether being connected to the garment at the first end, the second end being removably connectable to a base disposed on a vehicle, the base being adapted to provide power to the at least one electrical conductor of the tether via the electrical contact, the at least one electrical element being provided power from the vehicle via the tether.

In some implementations, the tether includes a cap at the second end, the cap being adapted for connecting to a base connector of the base, the cap including a resilient portion, the resilient portion being deflected during connection of the cap to the base connector.

In some implementations, the tether further comprises at least one of an electronic storage device storing an identification code at the second end adapted for use with a code receiver provided by the base; a magnet at the second end adapted for use with a switch operative to stop propulsion of a vehicle provided by the base; and a tether cord between the first and second ends of the tether.

In some implementations, the tether further comprises a radio frequency (RF) transponder, the RF transponder including the electronic storage device and the code receiver is an RF receiver, the code receiver being adapted for wirelessly receiving the identification code from the RF transponder.

In some implementations, the electrical contact of the tether is integral with the cap.

For purposes of this application, terms related to spatial orientation such as forwardly, rearwardly, upwardly, downwardly, left, and right, are as they would normally be understood by a driver of the vehicle sitting thereon in a normal riding position.

Implementations of the present technology each have at least one of the above-mentioned aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Although the present technology is described below with respect to a snowmobile, it is contemplated that aspects could be applied to other vehicles, including, but not limited to: personal watercrafts (PWCs), boats, side-by-side vehicles (SSVs), all-terrain vehicles (ATVs), and on-road vehicles such as motorcycles.

Figure 1:
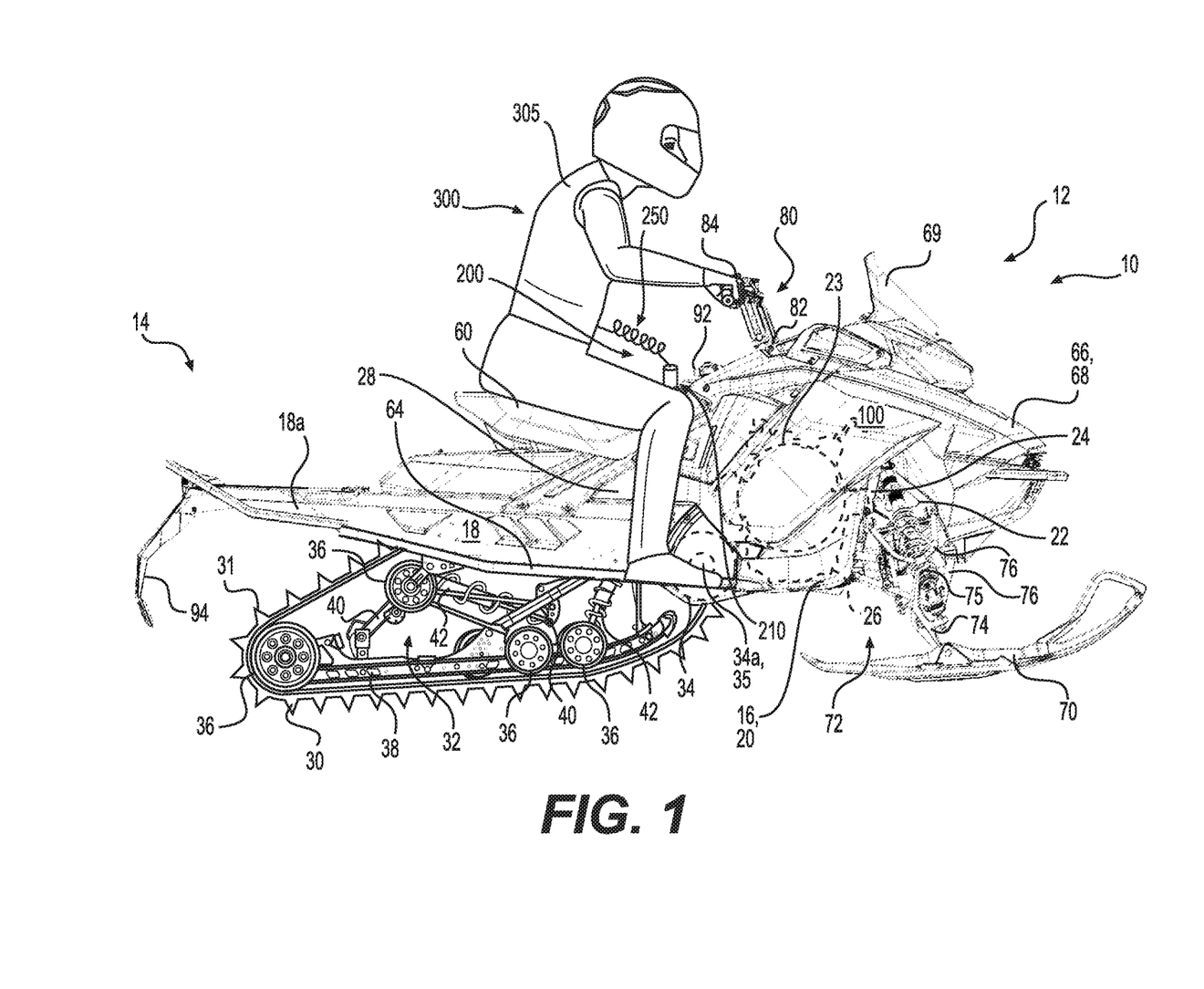
FIG. 1 is a right side elevation view of a snowmobile and a rider thereupon.

With reference to FIG. 1, a snowmobile 10 includes a front end 12 and a rear end 14 which are defined consistently with a travel direction of the vehicle 10. The snowmobile 10 includes a vehicle body in the form of a frame or chassis 16 which includes a rear tunnel 18, an engine module 20, a front suspension module 22 and an upper structure 24. The tunnel 18 is formed from sheet metal parts assembled to form an inverted U-shape when viewed from the forward or rearward end 12, 14. The inverted U-shaped tunnel 18 has a left side portion 18a and a right side portion 18a (only the right being shown).

A motor 26, schematically illustrated in FIG. 1, is carried in an engine compartment defined by the engine module 20 of the frame 16 and provides, in part, propulsion of the snowmobile 10. In the illustrated implementation, the motor 26 is an internal combustion engine 26, but it is contemplated that it could be, for example, an electric motor or a hybrid. A fuel tank 28, supported above the tunnel 18, supplies fuel to the engine 26 for its operation.

An endless drive track 30 is positioned generally under the tunnel 18, and is operatively connected to the engine 26 via a drivetrain including a belt transmission system (not shown) and a reduction gear assembly 23 (shown schematically). The endless drive track 30 is driven to run about a rear suspension assembly 32 connected to the frame 16 for propulsion of the snowmobile 10. The endless drive track 30 has a plurality of lugs 31 extending from an outer surface thereof to provide traction to the track 30.

The rear suspension assembly 32 includes a pair of drive sprockets 34 (shown schematically) mounted on a drive axle 35 (shown schematically), multiple idler wheels 36 and a pair of slide rails 38 in sliding contact with the endless drive track 30. The drive axle 35 having the drive sprockets 34 mounted thereon defines a drive axle axis 34a. The slide rails 38 are attached to the tunnel 18 by front and rear suspension arms 40 and one or more shock absorbers 42 which include a coil spring surrounding the individual shock absorbers 42. It is contemplated that the snowmobile 10 could be provided with a different implementation of a rear suspension assembly 32 than the one shown herein.

A straddle-type seat 60 is positioned atop the fuel tank 28. The seat 60 is adapted to accommodate a driver of the snowmobile 10, as shown in FIG. 1. The seat 60 can also be configured to accommodate a passenger. A tether base 210 is mounted to the snowmobile 10 forward of the seat 60. It is contemplated that parts of the base 210 could be integral with the top surface of the snowmobile 10. The base 210 is adapted to receive a tether 250, as part of a tether system 200 for connecting an electrified garment 300 to the snowmobile 10. Details of the tether system 200 will be described in more detail below.

A fuel tank fill opening covered by a cap 92 is disposed on the upper surface of the fuel tank 28 in front of the seat 60. It is contemplated that the fuel tank fill opening 92 could be disposed elsewhere on the fuel tank 28. A footrest 64 is positioned on each side of the snowmobile 10 below the seat 60 to accommodate the driver's feet. Each of the left and right footrests 64 extends generally laterally outwardly from the corresponding left and right side portion of the tunnel 18. In the illustrated implementation, each side portion 18a of the tunnel 18 is bent laterally outwardly at its bottom edge to form the corresponding footrest 64. It is however contemplated that the footrest 64 could be formed separately from and mounted to the tunnel 18.

At the front end 12 of the snowmobile 10, fairings 66 enclose the engine 26, the continuous variable transmission system 23 and other components of the powerpack such as the air intake system. The fairings 66 include a hood 68 which can be opened to allow access to the engine 26 and other internal components of the snowmobile 10 from the top and the front which may be required, for example, for inspection or maintenance of the engine 26 and/or the powerpack. The fairings 66 also include two side panels 100 extending along the left and right sides of the snowmobile 10. The engine 26 and the transmission system 23 are disposed between the side panels 100. The side panels 100 are both removably connected to the frame 16 and/or to other fairing panels and can be removed to access the internal components from the corresponding lateral side. A windshield 69 connected to the fairings 66 acts as a wind screen to lessen the force of the air on the rider while the snowmobile 10 is moving.

Two skis 70 positioned at the forward end 12 of the snowmobile 10 are attached to the front suspension module 22 of the frame 16 through a front suspension assembly 72. The front suspension module 22 is connected to the front end of the engine module 20. The front suspension assembly 72 includes ski legs 74, shock absorbers 75, supporting arms 76 and ball joints (not shown) for operatively connecting to the respective ski leg 74, supporting arms 76 and a steering column 82.

A steering assembly 80, including the steering column 82 and a handlebar 84, is provided generally forward of the seat 60. The steering column 82 is rotatably connected to the frame 16. The lower end of the steering column 82 is connected to the ski legs 74 via a steering rod (not shown). The handlebar 84 is attached to the upper end of the steering column 82. The handlebar 84 is positioned in front of the seat 60. The handlebar 84 is used to rotate the steering column 82, and thereby the skis 70, in order to steer the vehicle 10. A throttle operator (not shown) in the form of a thumb-actuated throttle lever is mounted to the right side of the handlebar 84. Other types of throttle operators, such as a finger-actuated throttle lever and a twist grip, are also contemplated. A brake actuator (not indicated), in the form of a hand brake lever, is provided on the left side of the handlebar 84 for braking the snowmobile 10 in a known manner. It is contemplated that the windshield 69 could be connected directly to the handlebar 84.

At the rear end of the snowmobile 10, a snow flap 94 extends downward from the rear end of the tunnel 18. The snow flap 94 protects against dirt that can be projected upward from the drive track 30 when the snowmobile 10 is being driven. It is contemplated that the snow flap 94 could be omitted.

The snowmobile 10 includes other components such as a display cluster, an exhaust system, an air intake system, and the like. As it is believed that these components would be readily recognized by one of ordinary skill in the art, further explanation and description of these components will not be provided herein.

The tether system 200 for connecting an electrified garment 300, specifically a jacket 300, to the snowmobile 10 will now be described with respect to FIGS. 2 to 5.

The tether system 200 includes a tether 250 which extends between first and second ends 260 and 270. The second end 260, hereinafter referred to as the snowmobile end 260, selectively and electrically connects to the snowmobile 10 at the tether head 266. The tether 250 is attached to the jacket 300 at the first end 270, hereinafter referred to as the garment end 270. The garment end 270 is connected to an electrical system 310 (shown schematically) in a garment body 305 of the jacket 300. The electrical system 310 includes a heating element 320 which heats the jacket 300 when with provided power from the snowmobile 10 via the tether system 200 (described in more detail below). It is contemplated that the jacket 300 could include additional heating elements 320. It is also contemplated that the jacket 300 could include additional or different electrical elements, including, but not limited to: one or more connections for supplying power to secondary garments, one or more connectors for providing power to electronic devices and one or more batteries for storing power provided from the snowmobile 10.

It is further contemplated that the tether 250 could connect to other garments worn by the rider, including, but not limited to, coats, overalls, pants, vests, vest liners, gloves, goggles, boots, helmets, tuques, and one-piece suits. It is also contemplated that the garment end 270 could be clipped to the jacket 300 or selectively connected to the jacket 300 and/or the electrical system 310 within or along the outside of the jacket 300.

Figure 2:
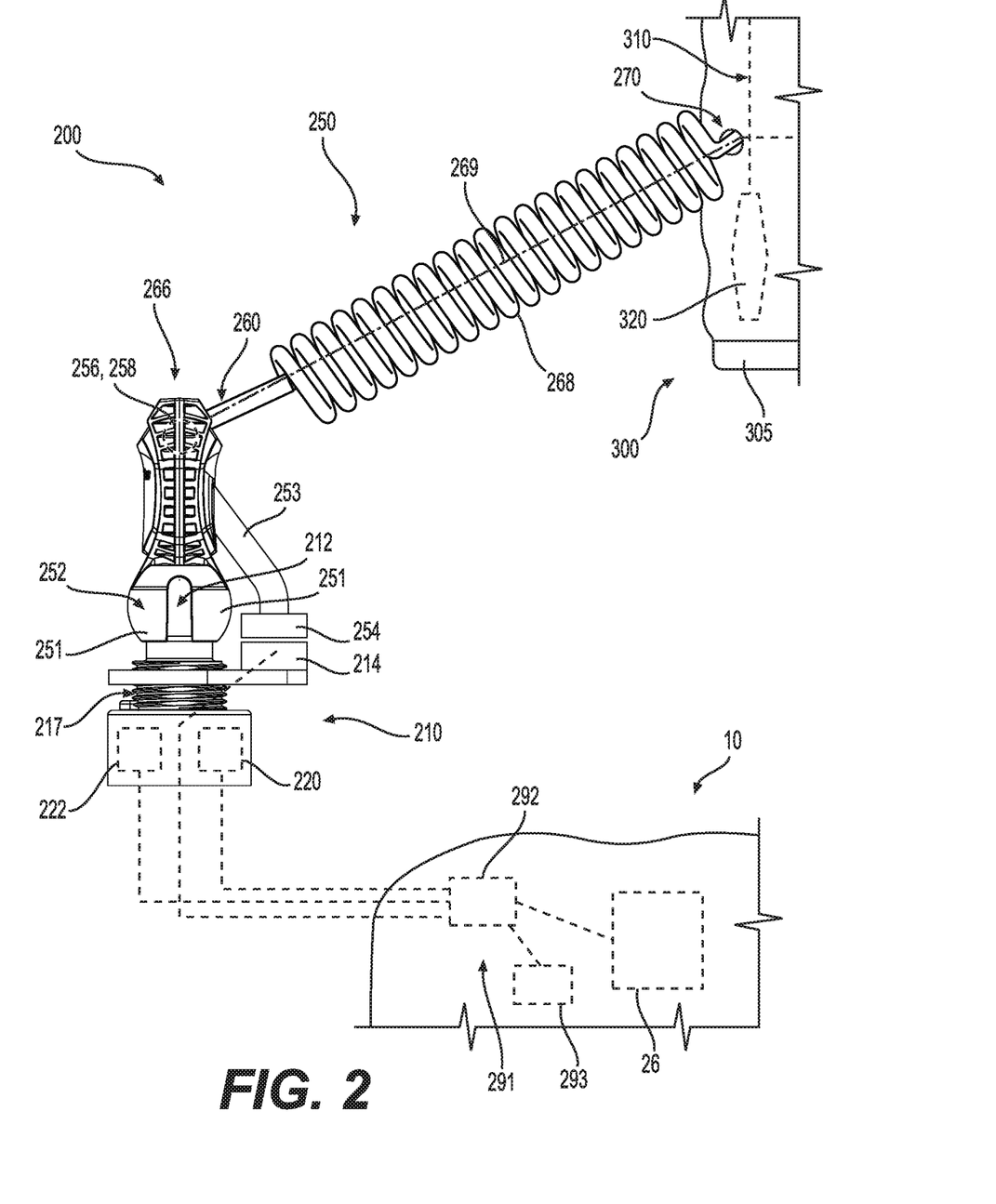
FIG. 2 is a left side elevation view of a garment and tether system and the snowmobile from FIG. 1.
Figure 3:
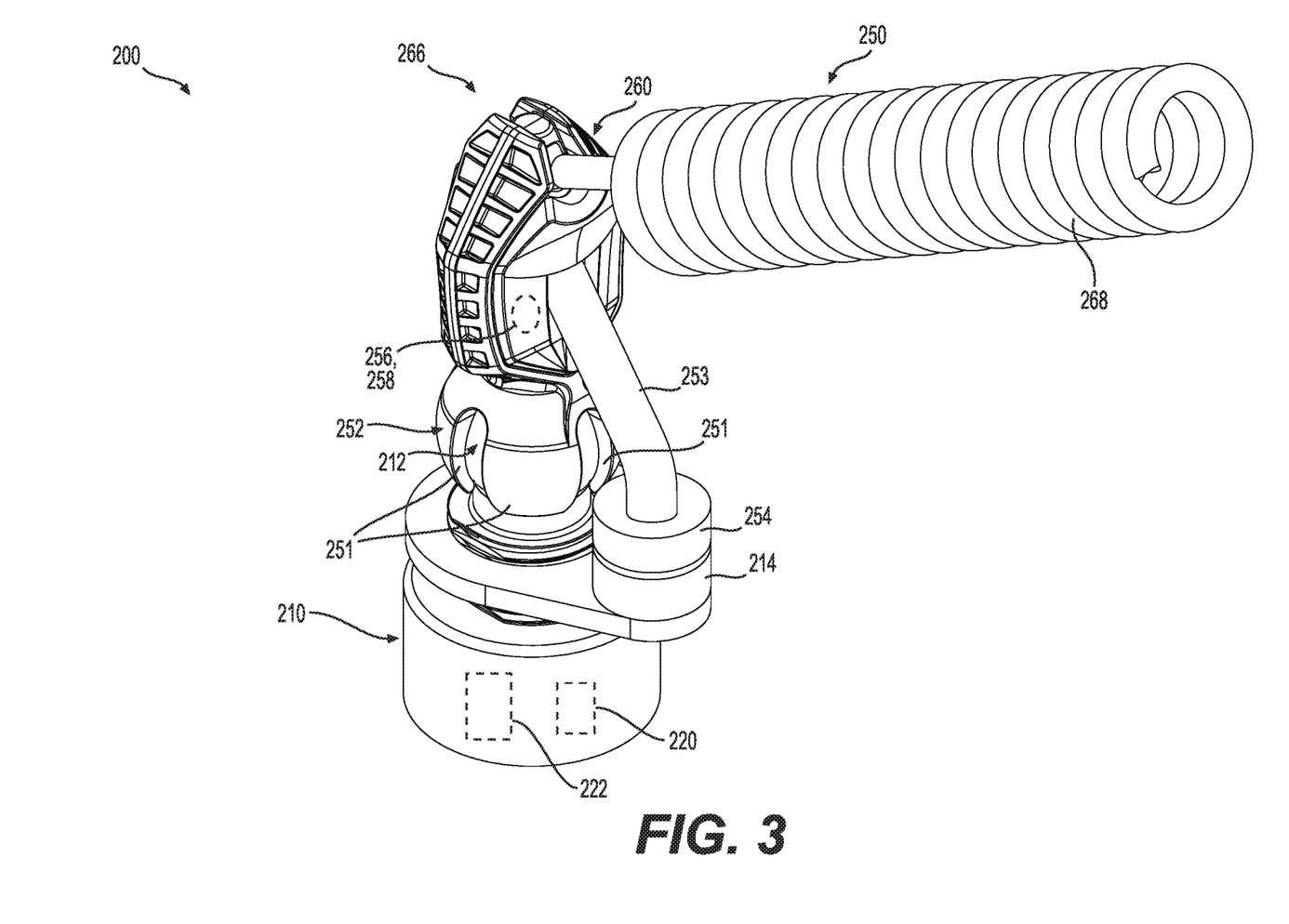
FIG. 3 is a top, rear, left side perspective view of the tether system of FIG. 2.

Between the tether head 266 and the garment end 270 of the tether 250 is a coiled tether cord 268, as illustrated in FIGS. 1 to 3. The cord 268 includes electrical wiring including two parallel, electrically isolated tether conductors 269 (shown schematically in FIG. 2) for delivering power from the snowmobile 10 to the jacket 300, which will be described in more detail below. The electrical conductors 269 of the cord 268, extending from the snowmobile end 260 to the garment end 270, is adapted to transmit sufficient current in order to power any electrical elements in the jacket 300. For example, as the snowmobile 10 will generally provide electricity at a 12V potential and a heating element of the jacket 300 may use up to 120 W of power, the electrical wiring of the cord 268 would need to be able to carry up to 10 A of electricity. It is contemplated that the snowmobile 10 may provide different potential connections, and the electrical elements may use different power.

The cord 268 is coated with a resilient polymer material, which allows it to bend, flex and change length with the rider during operation of the snowmobile 10. It further protects the cord 268 in case of the tether 250 being suddenly disconnected from the snowmobile 10. It is contemplated that the cord 268 could include other or additional materials, including but not limited to: nylon, rubber, and waterproof cloth. It is also contemplated that the cord 268 is not restricted to the coiled implementations illustrated in the FIGS. 1 and 2. It is contemplated that the tether 250 could be coiled around a spring-loaded spool.

The tether head 266 at the snowmobile end 260 of the tether 250 selectively connects the tether 250 to the snowmobile 10. Specifically, the tether head 266 selectively connects to the base connector 212 of the base 210. The tether head 266 includes a cap 252. The cap 252 has four resilient petals 251 that fit around the base connector 212, which is in the form of a ball. It is contemplated that the cap 252 could have more or less resilient petals 251. It is also contemplated that the cap 252 and base connector 212 could be in a different form in different implementations. These could include, but are not limited to, in the form of a cylindrical cup for the cap 252 and a cylinder for the base connector 212 or a fork-shaped lock plate and plunger arrangement.

The base 210 further includes a central flexing portion 217 which allows the base connector 212 to pivot with respect to snowmobile 10, allowing some movement of the tether head 266 when the tether system 200 is connected.

The tether head 266 includes a protrusion 253 that supports an electrical connector 254, which is a magnetic conductive connector 254. The protrusion 253 rigidly supports the connector 254, but it is contemplated that the protrusion 253 could be flexible. The connector 254, when connected to an electrical terminal 214 of the base 210, provides an electronic connection between the tether 250 and the snowmobile 10 in order to provide power to the jacket 300. The terminal 214 is a magnetic conductive connector 214 that receives the connector 254 of the tether 250. The base 210 is connected to an electrical system 291 (shown schematically) of the snowmobile 10 which provides power to the base 210 from an alternator 293 to the connector 214. It is contemplated that the snowmobile 10 could provide power from a start-up battery or a magneto. It is also contemplated that the connectors 254, 214 could be different types of corresponding electrical contacts, depending on the implementation, including but not limited to, a plug and a corresponding socket. In some implementations, it is further contemplated that the magnetic electrical connectors 254, 214 could be provided as a kit to be added to an existing tether system, with a protrusion kit to be added to a tether head and a terminal kit to be added to a base on the snowmobile 10.

The tether system 200 includes a safety system, in which the base 210 is adapted to stop or prevent propulsion of the snowmobile 10 when the tether 250 is disconnected therefrom. As the tether 250 is connected to the jacket 300, the tether head 266 is pulled off the base connector 212 if the rider leaves the snowmobile 10. Upon this disconnection, propulsion of the snowmobile 10 is stopped or prevented (described below) to stop the snowmobile 10 from traveling without the rider. This is commonly known as an "engine cut-off switch" or an "immobilization switch", although the engine 26 is not necessarily turned off ("cut-off") and the snowmobile 10 is not necessarily immobilized.

Figure 4:
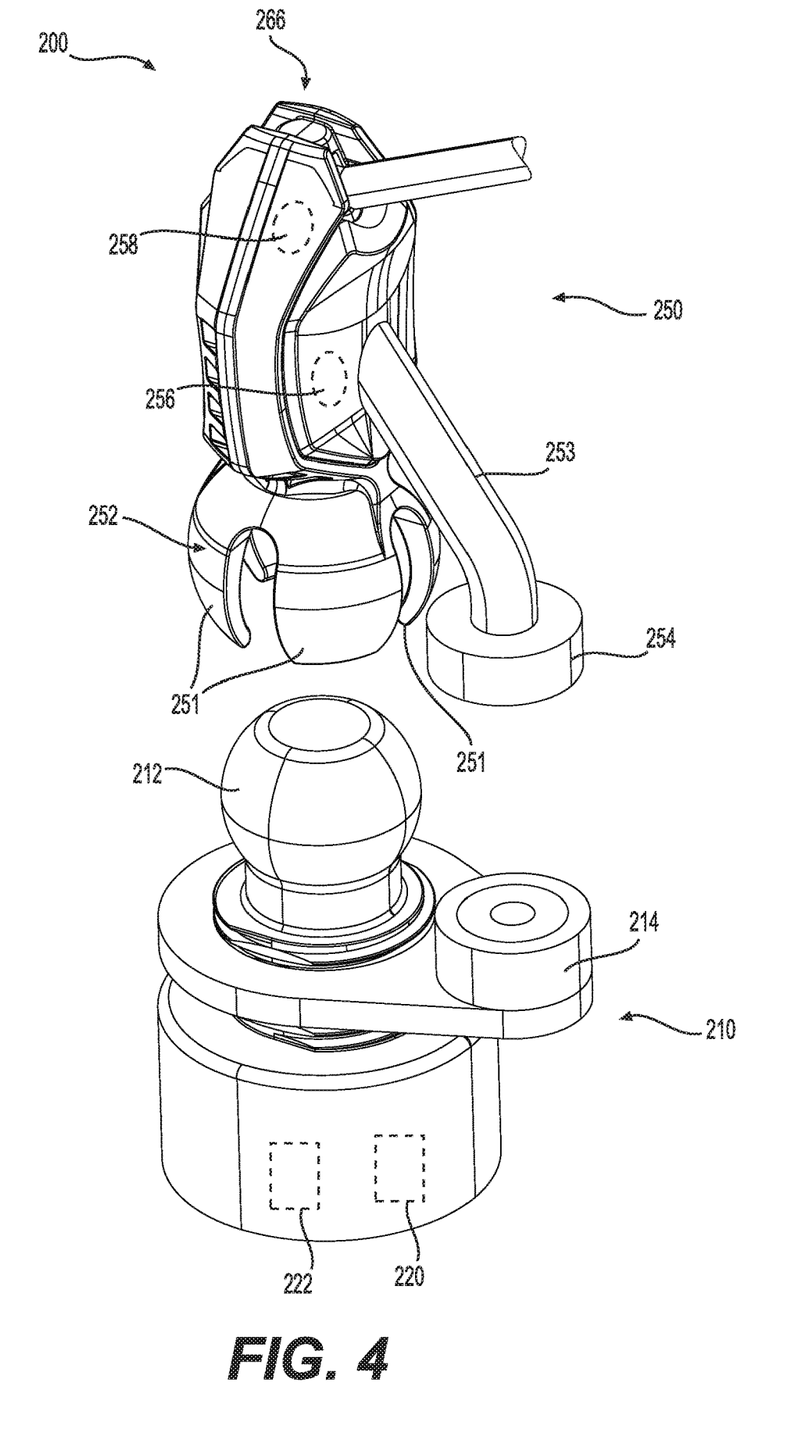
FIG. 4 is a top, rear, left side perspective view of the tether system of FIG. 3, with a tether and a base of the tether system shown separated.
Figure 5:
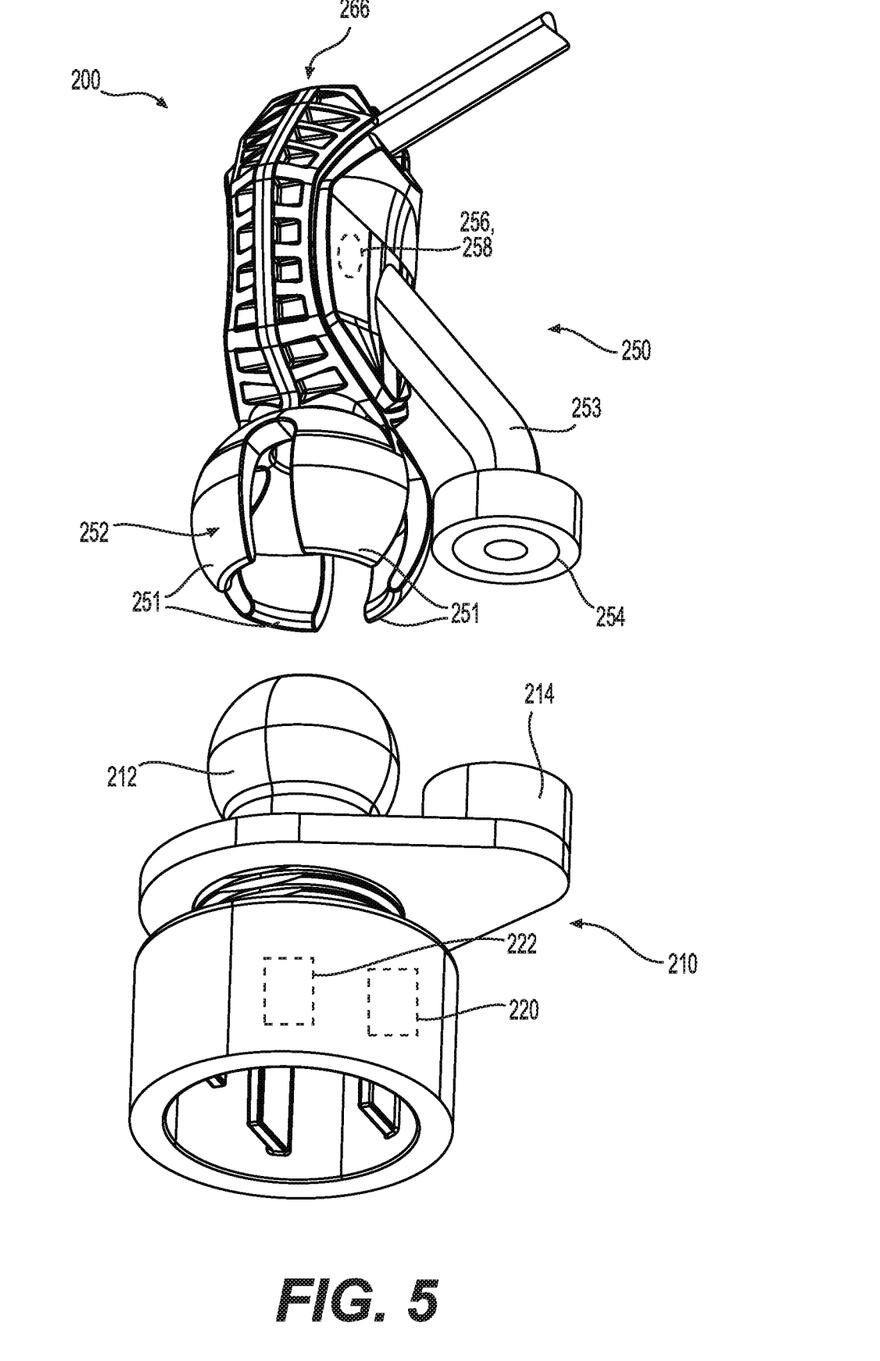
FIG. 5 is a bottom, rear, left side perspective view of the tether system of FIG. 3, with the tether and the base of the tether system shown separated.

Specifically the base 210 includes a reed switch 222 which is actuated by a magnetic field. The tether head 266 includes a corresponding magnet 256 which provides the magnetic field for actuating the reed switch 222. When the tether head 266 is installed on the base connector 212, the magnet 256 in the tether head 266 closes the reed switch 222. When the tether head 266 is removed from the base connector 212, the magnetic field due to the magnet 256 is removed, resulting in the reed switch 222 opening.

The reed switch 222 is part of a circuit connected to an engine control unit 292 (ECU) (shown schematically) which manages operation of the engine 26. The circuit is completed when the reed switch 222 is closed, and the ECU 292 operates the engine 26 according to standard operational procedures. When the circuit is open, the ECU 292 limits operations of the engine 26. Specifically, the engine 26 is kept in a low regime where the transmission system 23 is not engaged, and thus no propulsive power is delivered to the track 30. The engine 26 may be left to run, however, such that the snowmobile 10 may be left to warm-up outside the rider's presence, for example, or to prevent the engine 26 from suddenly shutting down should the tether 250 become dislodged. It is contemplated that the ECU 292 may perform other or additional actions upon opening the circuit, including but not limited to, shutting down the engine 26, interrupting the ignition circuit, preventing fuel delivery, preventing air delivery and opening a clutch, as well as some combination thereof. It is also contemplated that the circuit may be connected to other features than the ECU 292 of the snowmobile 10.

The tether system 200 also includes an anti-theft system, in which the tether head 266 includes an electronic storage device 258 which transmits an identification code to a code receiver 220 in the base. Specifically, the tether head includes a radio frequency (RF) transponder 258, the transponder 258 including the storage device 258, which transmits the identification code in response to the presence of a magnetic field generated by the base 210. The base 210 includes a corresponding radio frequency code receiver 220 which is connected to the ECU 292.

The receiver 220 is able to receive the identification code from the transponder 258 only when the tether head 266 and the base connector 212 are linked to each other. The term "read" is intended to encompass any means of sensing, detecting or distinguishing an identification feature of a key, such as the information transmitted by the transponder 258. It is contemplated that the base 210 could receive and confirm that a received code is the correct identification code. It is also contemplated, for some implementations, that the link between the receiver 220 and the key could be via physical contact, such as a mechanical contact or an electrical connection. The link could also be established without any physical contact. For example, the link could be a wireless link by means of conductive contacts, electromagnetic, optical or radio-frequency communication, and the like.

The ECU 292, upon receiving one or more signals from the receiver 220 indicating that the identification code has been read from the transponder 258 and matches an identification code stored in the ECU 292, proceeds with normal start-up operation. As the identification code transmitted by the transponder 258 is unique, the ECU 292 prevents the engine 26 from starting in normal mode so long as the receiver 220 has not read the proper identification code. Thus, the engine 26 and other systems of the snowmobile 10 can be turned on or activated generally only if the tether 250 and the base 210 are connected. This acts as a theft prevention measure, helping to assure that only the authorized rider may operate the snowmobile 10. It is contemplated that some functions of the snowmobile 10 could still be functional without the transponder 258.

The anti-theft and safety systems could be combined into a security system such as, for example, Bombardier Recreational Product's Digitally Encoded Security System (DESS™). Some implementations of the tether system 200, however, could include only parts of the security system, or exclude it altogether. It is contemplated that implementations of the tether system 200 could include more or less security system functions, including the reed switch 222 and/or the receiver 220. It is also contemplated that other systems for verifying authorization could be included. For example, a key separate from the tether system 200 could be used to provide the encoded identification information, such as a ring or a card.

While the base 210 of the present implementation provides the electrical terminal 214, the reed switch 222, and the code receiver 220 in a single unit, this need not necessarily be the case for all implementations. It is contemplated that the base 210 could be split into two or more separate components. For example, the electrical terminal 214 could be provided on a separate base extending from the snowmobile 10 (instead of being integral with the base 210 supporting the base connector 212). It is also contemplated that the reed switch 222 and the code receiver 220 could be provided in separate bases extending from the snowmobile 10. In some such implementations, the tether 250 could be provided with one or more tether heads 266. It is further contemplated that the electrical terminal 214, the reed switch 22, and the code received 220 could each be disposed in its own respective base for connecting separately to the tether 250.

To connect the tether 250 to the snowmobile 10, the cap 252 is pushed onto the base connector 212 in a generally downward direction. The petals 251 deflect slightly to pass around the ball of the connector 212, and return their previous position once the cap 252 is on the connector 212, helping the cap 252 and connector 212 remain connected. If the electrical connectors 254, 214 are not already connected, the tether head 266 is rotated about a generally vertical axis until the magnetic electrical connectors 254, 214 are connected, in order to allow power to flow from the snowmobile 10 to the jacket 300.

To separate the tether 250 from the base 210, the tether head 266 is pulled in a generally upward direction, such that the petals 251 once again deflect while passing around the connector 212.

Figure 6:
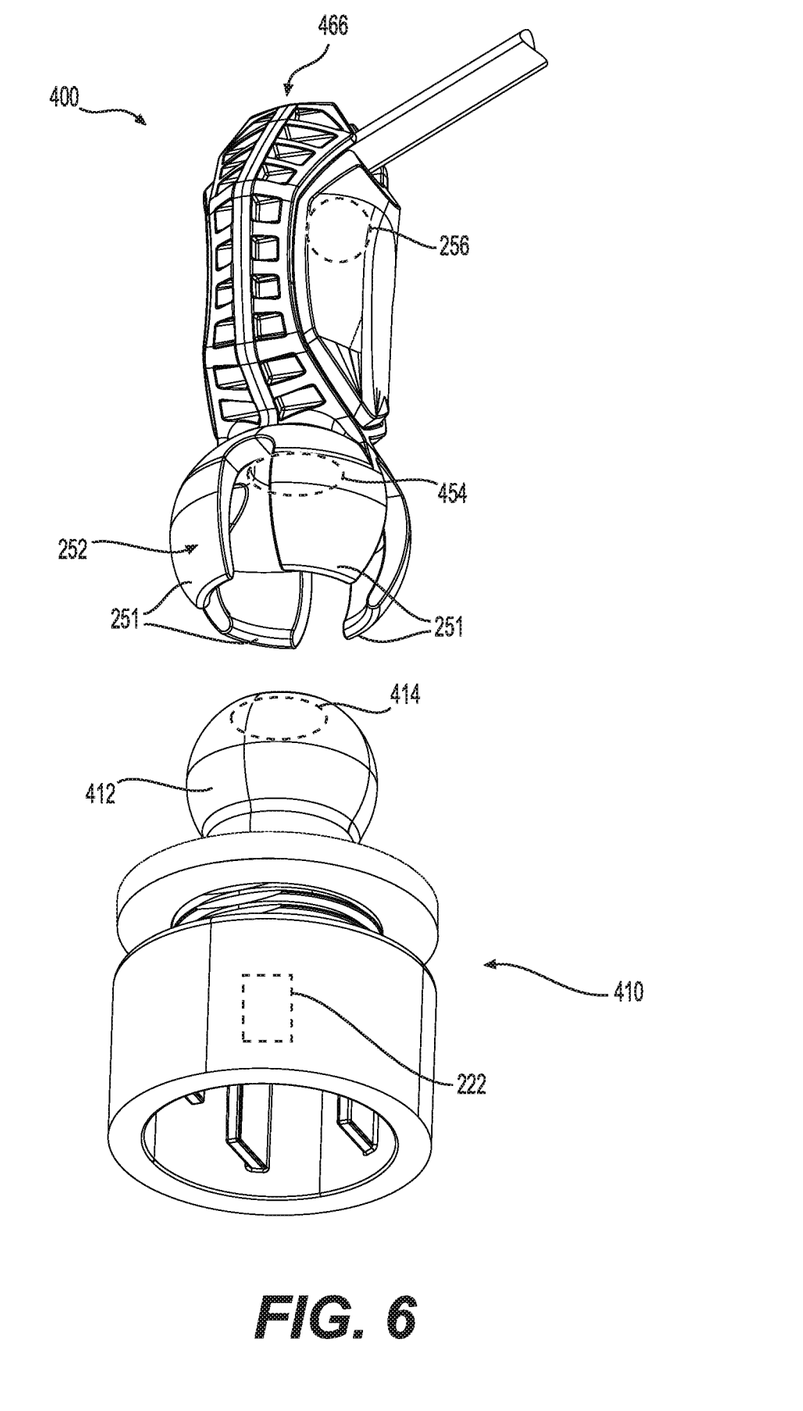
FIG. 6 is a bottom, rear, left side perspective view of another implementation of a tether system, with a tether and a base of the tether system shown separated.

FIG. 6 illustrates another implementation of a tether system 300, where a tether head 366 is shown separated from a base 310. Features presented with respect to the tether system 200 will not be reintroduced and retain their same reference numerals.

The electrical connectors 254, 214, as illustrated in FIGS. 2 to 5, are provided external to the cap 252 and the base connector 212 to help prevent electrical interference between the electrical connection made by connectors 254, 214 and the RF signal being sent between the chip 256 and the reader 220. In the implementation illustrated in FIG. 6, an electrical connection 454 is provided integral to the tether head 466, and a corresponding electrical contact 414 is provided integral to the base 410.

The tether system 400 is provided without the RF transponder and receiver pair, as the integral electrical connections 414, 454 could cause electromagnetic interference, although this will depend on the implementation. It is contemplated that the system 400 could be provided with some version of an RF transponder and receiver system, or other anti-theft system, such as a separate key ignition system. It is also contemplated that the tether system 400 could include electromagnetic shielding to decrease possible electromagnetic interference.

It is contemplated that some implementations of the tether system 400 could be provided with the RF transponder and receiver pair as described above with respect to tether system 200. In such implementations, the tether system 400 could be programmed to activate first the RF transponder and receiver pair, to match the identification code (as described above) and then proceed with normal start-up operation. Only once this has been done, the electrical connection would be then activated (through connectors 412, 454). By separating activation of the RF pair and the electrical connection, electromagnetic interference between the electrical connection and the RF transponder and receiver pair could be avoided or reduced, while still integrating the RF transponder receiver pair and the electrical connection into a co-located connection.

The snowmobile 10 implemented in accordance with some non-limiting implementations of the present technology can be represented as presented in the following numbered clauses.

CLAUSE 1: A tether system (200) for providing power from a vehicle (10) to a garment (300), comprising: a tether (250) including: a first end (270) and a second end (260), at least one electrical conductor (269) operatively connected between the first and second ends (270, 260), and an electrical contact (254) at the second end (260), the tether (250) being adapted for connecting to the garment (300) at the first end (270); and a base (210) adapted for mounting to the vehicle (10), the second end (260) of the tether (250) being selectively connected to the base (210), the base (210) being adapted for selectively receiving the electrical contact (254) and for providing power to the at least one electrical conductor (269) of the tether (250) via the electrical contact (254), the base (210), when mounted to the vehicle (10), being operative to stop propulsion of the vehicle (10) when the tether (250) is disconnected from the base (210).

CLAUSE 2. The system of clause 1, wherein: the base (210) includes a base connector (212); the tether (250) includes a cap (252) at the second end (260); and the cap (252) is selectively connected to the base connector (212).

CLAUSE 3. The system of clause 2, wherein the cap (252) includes a resilient portion (251), the resilient portion (251) being deflected during connection of the cap (252) to the base connector (212).

CLAUSE 4. The system of any one of clauses 1 to 3, wherein: the tether (250) further includes a magnet (256) at the second end (260); and the base (210) further includes a switch (222) operative to stop propulsion of the vehicle (10) when the switch (222) is open, the switch (222) being closed responsive to the presence of the magnet (256) when the tether (250) is connected to the base (210).

CLAUSE 5. The system of any one of clauses 1 to 4, wherein: the tether (250) further includes an electronic storage device (258) for storing an identification code at the second end (260); and the base (210) further includes a code receiver (220) operative to receive the identification code when the tether (250) is connected to the base (210), the base (210) being adapted to prevent the vehicle (10) from starting when the code receiver (220) has not received the identification code.

CLAUSE 6. The system of clause 5, wherein: the tether (250) further comprises a radio frequency (RF) transponder (258), the RF transponder (258) including the electronic storage device (258); and the code receiver (220) is an RF receiver (22), the code receiver (220) being adapted for wirelessly receiving the identification code from the RF transponder (258).

CLAUSE 7. The system of any one of clauses 1 to 6, the tether (250) further including a tether cord (268) between the first and second ends (270, 260).

CLAUSE 8. The system of any one of clauses 1 to 7, wherein: the base (210) includes a base terminal (214); and the electrical contact (254) of the tether (250) is adapted to electrically connect to the base terminal (214).

CLAUSE 9. The system of any one of clauses 2 to 7, wherein: the electrical contact (254) of the tether (250) is integral with the cap (252); and the base connector (212) is adapted to electrically connect to the electrical contact (254) of the tether (250).

CLAUSE 10. The system of any one of clauses 2 to 8, wherein the electrical contact (254) of the tether (250) is provided external to the cap (252).

CLAUSE 11. A vehicle (10) comprising: a vehicle body (16); a propulsion system (26, 30) connected to the vehicle body (16); a base (210) connected to the vehicle body (16); and a tether (250) having a first end (270) and a second end (260), the tether (250) being connectable to a garment (300) at the first end (270), the tether (250) including an electrical contact (254) at the second end (260), the second end (260) of the tether (250) being removably connected to the base (210), the base (210) being adapted to provide power to the tether (250) via the electrical contact (254), the base (210) being operative to stop propulsion of the vehicle (10) when the tether (250) is disconnected from the base (210).

CLAUSE 12. The vehicle (10) of clause 12, wherein: the base (210) includes a base connector (212); the tether (250) includes a cap (252) at the second end (260); and the cap (252) is adapted for connecting to the base connector (212).

CLAUSE 13. The vehicle (10) of clause 12, wherein the cap (252) includes a resilient portion (251), the resilient portion (251) being deflected during connection of the cap (252) to the base connector (212).

CLAUSE 14. The vehicle (10) of any one of clauses 11 to 13, wherein: the tether (250) further includes a magnet (256) at the second end (260); and the base (210) further includes a switch (222) operative to stop propulsion of the vehicle (10) when the switch (222) is open, the switch (222) being closed responsive to the presence of the magnet (256) when the tether (250) is connected to the base (210).

CLAUSE 15. The vehicle (10) of any one of clauses 11 to 14, wherein: the tether (250) further includes an electronic storage device (258) for storing an identification code at the second end (260); and the base (210) further includes a code receiver (220) operative to receiver the identification code when the tether (250) is connected to the base (210), the base (210) being adapted to prevent the vehicle (10) from starting when the code receiver (220) has not receiver the identification code.

CLAUSE 16. The vehicle (10) of claim 15, wherein: the tether (250) further comprises a radio frequency (RF) transponder (258), the RF transponder (258) including the electronic storage device (258); and the code receiver (220) is an RF receiver (22), the code receiver (220) being adapted for wirelessly receiving the identification code from the RF transponder (258).

CLAUSE 17. The vehicle (10) of any one of clauses 11 to 16, wherein: the base (210) includes a base terminal (214); and the electrical contact (254) of the tether (250) is adapted to electrically connect to the base terminal (214).

CLAUSE 18. The vehicle (10) of any one of clauses 12 to 16, wherein: the electrical contact (254) of the tether (250) is integral with the cap (252); and the base connector (212) is adapted to electrically connect to the electrical contact (254) of the tether (250).

CLAUSE 19. The vehicle (10) of any one of clauses 12 to 18, wherein the electrical contact (254) of the tether (250) is provided external to the cap (252).

CLAUSE 20. The vehicle (10) of any one of clauses 12 to 19, wherein: the vehicle (10) is a snowmobile (10); the vehicle body (16) includes a frame (16); and the propulsion system (26, 30) includes a motor (26) operatively connected to the frame (16); and the vehicle (10) further comprises: a straddle seat (60) connected to the frame (16) and configured to accommodate at least a driver of the snowmobile (10); and an endless track (30) operatively connected to the motor (26).

CLAUSE 21. A garment (300) and tether system (200) comprising: a garment (300) including: a garment body (305), and at least one electrical element (32) connected to the garment body (305); and a tether (250) including: a first end (270) and a second end (260), at least one electrical conductor (269) operatively connected between the first and second ends (270, 260), and an electrical contact (254) at the second end (260), the tether (250) being connected to the garment (300) at the first end (270), the second end (260) being removably connectable to a base (210) disposed on a vehicle (10), the base (210) being adapted to provide power to the at least one electrical conductor (269) of the tether (250) via the electrical contact (254), the at least one electrical element being provided power from the vehicle (10) via the tether (250).

CLAUSE 22. The garment (300) and tether system (200) of clause 20, wherein the tether (250) includes a cap (252) at the second end (260), the cap (252) being adapted for connecting to a base connector (212) of the base (210), the cap (252) including a resilient portion (251), the resilient portion (251) being deflected during connection of the cap (252) to the base connector (212).

CLAUSE 23. The garment (300) and tether system (200) of clause 21 or 22, wherein the tether (250) further comprises at least one of: an electronic storage device (258) storing an identification code at the second end (260) adapted for use with a code receiver (220) provided by the base (210); a magnet (256) at the second end (260) adapted for use with a switch (222) operative to stop propulsion of a vehicle (10) provided by the base (210); and a tether cord (268) between the first and second ends (270, 260) of the tether (250).

CLAUSE 24. The garment (300) and tether system (200) of clause 23, wherein: the tether (250) further comprises a radio frequency (RF) transponder (258), the RF transponder (258) including the electronic storage device (258); and the code receiver (220) is an RF receiver (220), the code receiver (220) being adapted for wirelessly receiving the identification code from the RF transponder (258).

CLAUSE 25. The garment (300) and tether system (200) of clause 22, wherein the electrical contact (254) of the tether (250) is integral with the cap (252).

Modifications and improvements to the above-described implementations of the present may become apparent to those skilled in the art. The foregoing description is intended to be exemplary rather than limiting. The scope of the present is therefore intended to be limited solely by the scope of the appended claims.

What is claimed is:

1. A garment and tether system comprising:
a garment including:
a garment body, and
at least one electrical element connected to the garment body; and
a tether including:
a first end and a second end,
at least one electrical conductor operatively connected between the first and second ends,
an electrical contact at the second end, and
a cap at the second end, the cap including a resilient portion,
the tether being connected to the garment at the first end, the second end being removably connectable to a base disposed on a vehicle, the base being adapted to provide power to the at least one electrical conductor of the tether via the electrical contact, the cap being adapted for connecting to a base connector of the base, the resilient portion of the cap being deflected during connection of the cap to the base connector,
the at least one electrical element being provided power from the vehicle via the tether.

2. The garment and tether system of claim 1, wherein the electrical contact of the tether is integral with the cap.

3. The garment and tether system of claim 1, wherein the tether further comprises at least one of:
an electronic storage device at the second end, the electronic storage device storing an identification code adapted for use with a code receiver of the base;
a magnet at the second end adapted for use with a switch of the base, the switch being operative to stop propulsion of the vehicle; and
a tether cord between the first and second ends of the tether.

4. The garment and tether system of claim 3, wherein:
the tether further comprises a radio frequency (RF) transponder, the RF transponder including the electronic storage device; and
the code receiver is an RF receiver, the code receiver being adapted for wirelessly receiving the identification code from the RF transponder.

5. A garment and tether system comprising:
a garment including:
a garment body; and
at least one electrical element connected to the garment body; and
a tether including:
a first end and a second end, the tether being connected to the garment at the first end, the second end being removably connectable to a base disposed on a vehicle;
at least one electrical conductor operatively connected between the first and second ends;
an electrical contact at the second end, the base being adapted to provide power to the at least one electrical conductor of the tether via the electrical contact; and
at least one of:
an electronic storage device at the second end, the electronic storage device storing an identification code adapted for use with a code receiver of the base;
a magnet at the second end adapted for use with a switch of the base, the switch being operative to stop propulsion of the vehicle; and
a tether cord between the first and second ends of the tether, the at least one electrical element being provided power from the vehicle via the tether.

6. The garment and tether system of claim 5, wherein:
the tether includes a cap at the second end, the cap being adapted for connecting to a base connector of the base, the cap including a resilient portion, the resilient portion being deflected during connection of the cap to the base connector; and
the electrical contact of the tether is integral with the cap.

7. The garment and tether system of claim 5, wherein:
the tether further comprises a radio frequency (RF) transponder, the RF transponder including the electronic storage device; and
the code receiver is an RF receiver, the code receiver being adapted for wirelessly receiving the identification code from the RF transponder.

* * * * *